Figure 1:
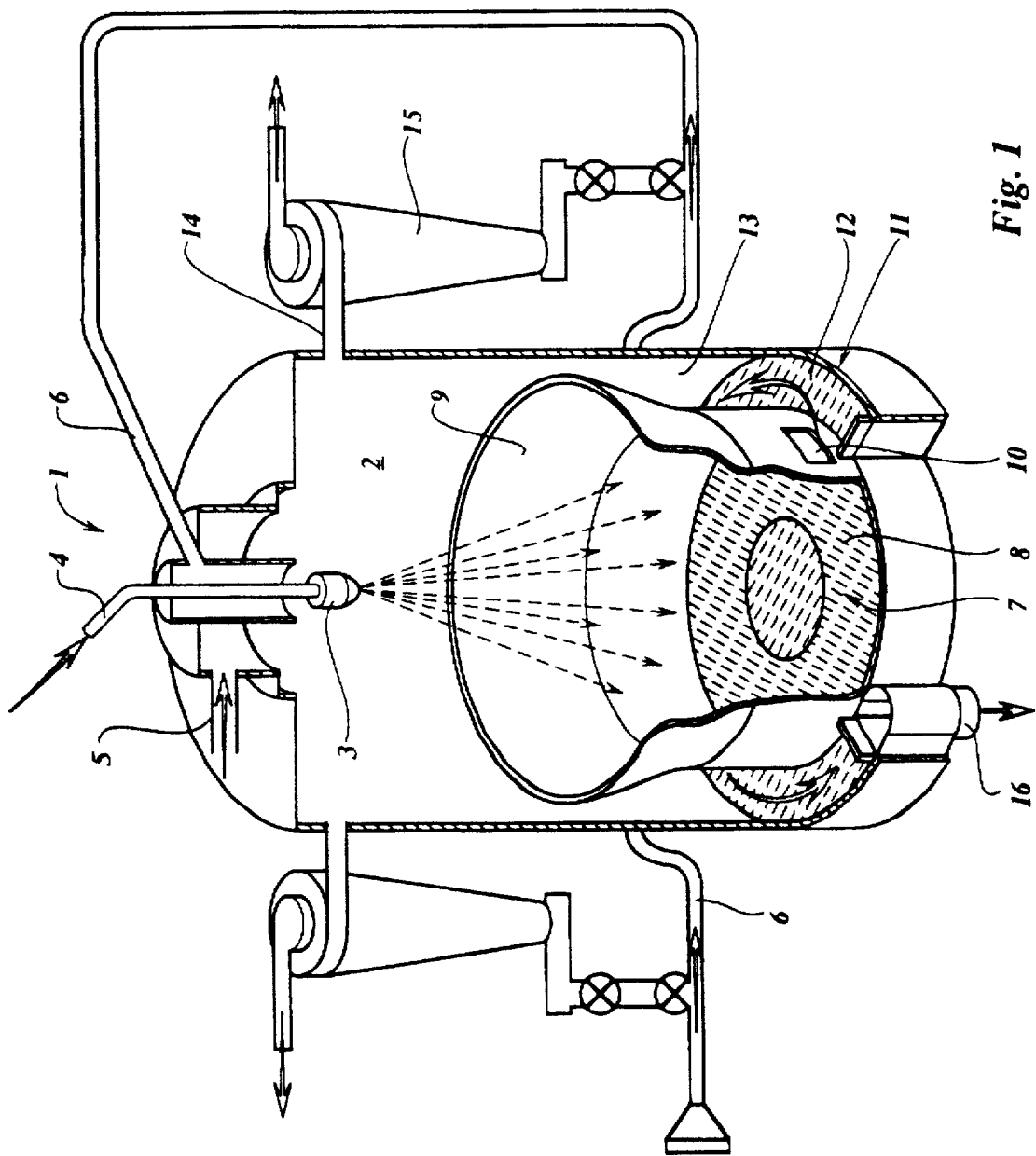

United States Patent [19]

Boersen et al.

[11] Patent Number: 5,782,010
[45] Date of Patent: Jul. 21, 1998

[54] DEVICE FOR PREPARING A SPRAY-DRIED PRODUCT AND METHOD FOR PREPARING A PRODUCT OF THIS KIND

[75] Inventors: Antonius Cornelus Boersen, Hillegom; Antonius Johannes Maria Bouman, Drachten, both of Netherlands

[73] Assignee: Stork Friesland B.V., Gorredijk, Netherlands

[21] Appl. No.: 635,136

[22] Filed: Apr. 19, 1996

[30] Foreign Application Priority Data

Jun. 20, 1995 [NL] Netherlands ............... 1000611
Apr. 19, 1996 [NL] Netherlands ............... 1002909

[51] Int. Cl.$^6$ ........................................ F26B 3/08
[52] U.S. Cl. ................... 34/359; 34/366; 34/370; 34/577; 34/589
[58] Field of Search .................. 34/364, 366, 370, 34/371, 372, 576, 577, 589, 591

[56] References Cited

U.S. PATENT DOCUMENTS

| | | | |
|---|---|---|---|
| 3,571,946 | 3/1971 | Karwell | 34/591 |
| 3,995,987 | 12/1976 | MacAskill | 432/15 |
| 4,490,403 | 12/1984 | Pisecky et al. | 426/453 |
| 4,492,040 | 1/1985 | Jensen et al. | 34/367 |
| 4,591,324 | 5/1986 | Kubota | 425/222 |
| 4,736,895 | 4/1988 | Huttlin | 241/40 |
| 5,254,168 | 10/1993 | Littman et al. | 118/666 |
| 5,579,588 | 12/1996 | Reh et al. | 34/359 |

FOREIGN PATENT DOCUMENTS

| | | |
|---|---|---|
| 2015941 | 4/1970 | France . |
| 2417336 | 9/1979 | France . |
| 2125155 | 11/1972 | Germany . |
| 2758080 | 7/1979 | Germany . |
| 8602952 | 6/1988 | Netherlands . |

Primary Examiner—Henry A. Bennett
Assistant Examiner—Pamela A. O'Connor
Attorney, Agent, or Firm—Quarles & Brady

[57] ABSTRACT

A device for preparing a spray-dried product is described, the distance between the distribution element and a fluidized bed in the device being such that the particles have essentially reached their critical moisture content. A method showing the mixing of the primary liquid droplets delivered by the distribution element and solid particles is also specified.

22 Claims, 3 Drawing Sheets

5,782,010

DEVICE FOR PREPARING A SPRAY-DRIED PRODUCT AND METHOD FOR PREPARING A PRODUCT OF THIS KIND

BACKGROUND OF THE INVENTION

The invention relates first of all to a device for preparing a spray-dried product, at least comprising a drying chamber with a distribution element placed therein for atomizing liquid to be spray-dried, with forming of a stream of primary liquid droplets, means for supplying drying gas in the vicinity of the distribution element and at least one fluidized bed which adjoins the drying chamber at a distance from the distribution element and comprising a bottom plate having openings with fluidizing gas supply means opening onto the underside thereof, as well as discharge means for discharging spray-dried product and gas from the device.

A device of this kind is generally known and is used for preparing spray-dried products, starting from solutions which contain the starting material for these products.

Spray-drying devices of the type mentioned are generally known and are described extensively in the general literature. For an overview of the basic aspects which are important in spray-drying and devices serving this purpose, reference is made, for example, to Food Engineering and Dairy Technology, H. G. Kessler, A. Kessler Verlag, Freising, Germany (1981).

Devices of the type referred to have the disadvantage that in general they occupy a relatively large volume as a result of the need to evaporate as much liquid as possible from the primary liquid droplets formed during their passage and for a relatively dry particle to arrive in the fluidized bed.

The object of the present invention is to provide a spray-dryer of the abovementioned type which occupies a considerably smaller volume than was hitherto found in the prior art.

SUMMARY OF THE INVENTION

To this end, the invention as referred to is characterized in that the distance of the distribution element above the fluidized bed is equal to the distance which is required to enable a primary liquid droplet to reach a moisture content which is in the range of from 1.5–0.75 times the critical moisture content under the conditions prevailing in the drying chamber.

According to generally accepted theory when spray-drying liquids containing solid substances, the drying can be subdivided into a number of stages, the first two of which are the most important in relation to the present invention.

In the first place, a first drying stage with a constant rate of evaporation is noted; free moisture which is situated on the surface of a primary liquid droplet formed evaporates immediately from that surface until a relatively dry shell is formed on the said surface. The total moisture content of the primary liquid droplet has then fallen to what is referred to as the critical moisture content of the droplet. After reaching the said critical moisture content, a second drying stage begins, the characterizing feature of which is that the rate of evaporation of moisture from the particle is determined by diffusion and depends on the rate of diffusion of moisture from the inside of the particle to the outer surface, the relatively dry shell forming a barrier which reduces the rate of evaporation, as a result of which this rate of evaporation will gradually decrease further.

The evaporation flux (weight of moisture which is removed per surface unit per unit time) is virtually constant in the first drying stage, while this flux exhibits a continuously falling course in the second drying stage.

The present invention now aims to provide a device of the type specified in which, for a primary liquid droplet, the first drying stage, that is to say the stage having a constant rate of evaporation or flux, takes place essentially in the drying chamber and before entering the fluidized bed, while the second drying stage takes place primarily in the fluidized bed and any downstream-connected devices.

In the prior art, the primary liquid droplet is generally in the second drying stage when it arrives in the fluidized bed; there is a considerable risk that overheating may have occurred during the passage through the drying chamber, having a disadvantageous effect on the product properties.

By carrying out drying essentially in the stage having a constant drying rate, the invention seeks to provide the product with a less rigorous drying treatment. The second drying stage in the fluidized bed, which is usually ideally mixed, can be controlled very accurately, so that overheating is easy to avoid there.

In general, the times that are required to pass through the first drying stage having a constant rate of evaporation are extremely short under the temperature, pressure, gas speed and gas moisture content conditions prevailing in the drying chamber, so that an extremely small volume of the drying chamber is sufficient.

The above-defined distance between the distribution element and the top side of the fluidized bed is equal to the distance which is required to enable a primary liquid droplet to reach a moisture content which is in the range of from 1.5–0.75 times the critical moisture content under the conditions which prevail in the drying chamber.

The said range is important, since variations within this range make it possible to enable a particle to arrive in the fluidized bed with properties which are suitable for the final purpose.

In the case of a distance which is equal to the distance corresponding to a moisture content of 1.5 times the critical moisture content, the primary droplet will still contain an amount of moisture at its surface, which, for example, can still give rise to the formation of agglomerates in the fluidized bed.

A distance which is equal to the distance which is appropriate for a moisture content of 0.75 times the critical moisture content provides a primary liquid droplet which is well dried on the surface and gives rise to little or no more formation of agglomerates in the fluidized bed.

In particular, the distance is made equal to the distance which is required to enable the primary droplet to reach a moisture content which is between 1.5 and 1.0 times the critical moisture content under the drying chamber conditions.

Advantageously, the distance is essentially equal to the distance which is required to enable the primary droplet to reach a moisture content which is equal to the critical moisture content under the drying chamber conditions.

The critical moisture content is a constant for a specific liquid droplet size distribution of a specific substance, and is to be determined outside the spray-drying device. The time which is required in order to reach the said state under the drying chamber conditions can likewise be determined, whilst the effective rate which must be taken into account can be adjusted as desired in the drying chamber within broad limits. The product of the time required to reach the critical moisture content and the average effective rate provides a measure for the distance between the distribution element and the top side of the fluidized bed which is required in order to enable a primary liquid droplet formed to reach its critical moisture content on travelling through the drying chamber.

More advantageously, in the device the primary liquid droplets essentially fall directly into the fluidized bed.

The above-described second drying stage, wherein a constantly falling drying rate is found, will generally take place in the fluidized bed adjoining the drying chamber, which fluidized bed is expediently in product flow connection with a fluidized aftertreatment bed.

In the said aftertreatment bed, a further phase of the second drying stage can be carried out, or alternatively a subsequent drying stage or a finishing treatment. A finishing treatment can consist of cooling, mixing with other substances, agglomerating by wetting, etc.

In a first embodiment of the aftertreatment bed adjoining the device, the said aftertreatment bed is enclosed by the drying chamber.

In particular, the fluidized bed and the fluidized aftertreatment bed respectively possess a first and a second bottom plate with openings while the device is designed such that the stream of primary liquid droplets falls essentially into the fluidized bed and material can be transported from the fluidized bed to the fluidized aftertreatment bed. In this embodiment, the stream of primary liquid droplets can be directed such that this falls essentially into the fluidized bed and not into the fluidized aftertreatment bed.

In an especially attractive embodiment, the fluidized aftertreatment bed essentially surrounds the fluidized bed.

When operating such a device, it is preferably ensured that there is ideal mixing in the centrally situated fluidized bed, in other words that the same conditions prevail throughout the entire fluidized bed. The fluidized aftertreatment bed expediently has a plug flow nature, in order to ensure that the aftertreatment takes place in exactly the same way for every particle and that in particular the residence time in the aftertreatment bed is also the same for all the particles.

In order to enable the supply of primary liquid particles, which have been dried to a greater or lesser extent, to the fluidized bed to take place in an outstanding manner, the first bottom plate of the fluidized bed is encircled by a dividing wall extending essentially parallel to the axis of the distribution element. In this way, it is possible to operate the two fluidized beds independently of one another, and the beds also remain physically separated from one another.

In a very advantageous embodiment, the fluidized bed comprises an essentially cylindrical bed having an essentially circular first bottom plate with openings, which is encircled by an essentially cylindrical dividing wall, the centrepoint of the first bottom plate being in line with the axis of the distribution element, and the second fluidized aftertreatment bed comprising an essentially annular bed located concentrically around the fluidized bed, having an essentially annular bottom plate with openings which is encircled by the cylindrical dividing wall around the fluidized bed and the outer wall of the drying chamber, which is likewise cylindrical, respectively.

The device in which the fluidized bed adjoining the drying chamber is in product flow connection with a fluidized aftertreatment bed, a general outline of which was given above, can also be designed such that the fluidized aftertreatment bed is disposed outside the drying chamber and is connected to the fluidized bed via a material transport line.

In an embodiment of the device of this kind, the ground surface area required can generally be selected to be smaller than in the arrangement described above, wherein a fluidized bed and a fluidized aftertreatment bed are integrated within one chamber.

In all cases however, it remains the case that the primary liquid droplets delivered by the distribution element have a moisture content on entering into the fluidized bed which is essentially in the region of the critical moisture content of the droplets, so that the drying chamber volume required can be very small.

In the abovementioned device according to the invention, it can be advantageous with regard to the aftertreatment bed for at least two gas supply means, which can be controlled separately, to be present on the underside of the bottom plate of the said bed, by means of which the fluidizing gases which can be supplied through these means can have different properties, such as, for example, temperature. However, the moisture content or the composition can also be set to different values in different parts of the aftertreatment bed.

In a very expedient embodiment of the device according to the invention, the surface of the underside of the bottom plate of the fluidized bed is partially covered by gas supply means which can be controlled separately and at that point permit a fluidizing gas flow rate through the corresponding part of the bottom plate which differs from the fluidizing gas main flow rate through the remaining part of the bottom plate. By installing such additional gas supply means (a so-called airbox), the loading of the gas flow can be increased at that location and optimum mixing conditions can be achieved. In addition to different gas flow conditions, the amounts of gas, the temperature and/or the composition can, of course, also be adjusted by means of the said airbox in this position, so as to deviate from the conditions in areas outside the said airbox.

In the above-described device according to the invention, it is specified that the distance of the distribution element from the top side of the fluidized bed is equal to the distance which is required to enable a primary liquid droplet to reach a moisture content which is in the range of from 1.5–0.75 times the critical moisture content under the conditions prevailing in the drying chamber.

If the distance is equal, for example, to a distance which is required to enable a liquid droplet to reach a moisture content of 1.5 times its critical moisture content, the primary liquid droplets are relatively moist when they arrive in the fluidized bed. Expediently, however, means are provided in the device for supplying solid particles to the primary liquid droplets delivered by the distribution element. These solid particles are, for example, dry particles which, by being mixed with the stream of liquid droplets which is delivered by the distribution element, can adhere to these liquid droplets and reduce the total moisture content.

In this way, it can be ensured that the mixture of the still moist liquid droplets which are delivered by the distribution element and the dry particles has reached an average moisture content which is essentially equal to or lower than the critical moisture content on arriving in the fluidized bed. In this way, subsequent agglomeration in the fluidized bed can be avoided to a large extent.

The abovementioned solid particles can, for example, also comprise fine particles which have been separated from the gases within the drying chamber; the solid particles may, however, also be solid particles obtained from another source or be solid particles which have been obtained from another source and have been mixed with fine particles which have been separated out of the drying chamber.

In order to obtain an optimum product formulation, it is advantageous if, in the device according to the invention, the means for supplying solid particles to the stream of primary liquid droplets which is delivered by the distribution element are adjustably disposed in relation to that distribution element. The position where the stream of solid particles and the stream of liquid droplets which is delivered by the distribution element make contact appears to be important for the quality of the product formed; the product can be optimized by making this position adjustable.

In particular, for the device according to the invention which comprises a fluidized bed which is surrounded by a fluidized aftertreatment bed, the drying chamber is a cylinder of constant diameter across its entire height. For reasons of flow technology, the drying chamber of spray-drying devices often comprises a wide portion, in which the drying takes place during the flight of the particles, and a narrow section, in which the fluidized bed is disposed. By using a fluidized bed which is surrounded by a fluidized aftertreatment bed, while a dividing wall is present between the two beds, in the device according to the invention, the conical course of the drying chamber wall can be avoided and a cylindrical chamber of constant diameter will suffice, which is advantageous for construction purposes.

The invention also relates to a method for preparing a spray-dried product, a liquid which is to be spray-dried being supplied to a distribution element which is situated inside a drying chamber and which atomizes the liquid into a stream of primary liquid droplets, while the primary liquid droplets are collected in a fluidized bed which adjoins the drying chamber.

In the said method, which is carried out using a device according to the invention, the primary liquid droplets which are delivered by the distribution element are given an average speed such that, on arriving in the fluidized bed adjoining the drying chamber, they have travelled through the drying chamber for essentially the period of evaporation at a constant rate, while they essentially fall into the fluidized bed. As was stated earlier, the said period can vary, in order either to enable the droplets to have a moisture level which is higher than the critical moisture content or to have a moisture content which is lower than the critical moisture content.

In many embodiments, which will be discussed below, the method will be carried out such that the moisture content of the liquid droplets on arriving in the fluidized bed is slightly higher than the critical moisture content; in many other cases, however, the said moisture content will be virtually equal to the critical moisture content.

As was stated earlier, a stream of solid particles can be supplied to the stream of primary liquid droplets which is delivered by the distribution element, while the weight ratio of solid particles to liquid can be selected within a broad range, but is generally greater than or equal to 1:2.

At least some of the solid particles can be formed by fine particles which have been separated from the gases which flow in the drying chamber, while the location at which the stream of solid particles and the stream of primary liquid droplets make contact with one another can be adjusted as a function of the desired quality of the final product.

BRIEF DESCRIPTION OF THE DRAWING

The invention will now be described with reference to the figure, in which:

FIG. 1 shows a device according to the invention in a first embodiment.

FIG. 2 shows a diagrammatic cross-section of the underside of the device from FIG. 1.

FIG. 3 shows a device according to the invention in a second embodiment.

The spray-drying device 1 according to the present invention comprises a drying chamber 2, which is cylindrical in the embodiment shown in FIG. 1 having a constant diameter over the length of the drying chamber. Placed in the top part of the drying chamber 2 is a distribution element 3, which is connected to a pipe 4 for supplying a liquid to be spray-dried. The distribution element 3 consists of, for example, a spray nozzle. In addition, it is also possible to atomize the liquid to be spray-dried ultrasonically. A supply pipe 5 for supplying warm drying gas to the drying chamber 2 is also present. Reference number 6 indicates a supply system for a stream of solid particles. In FIG. 1 the supply system 6 comprises a supply pipe which opens into a tubular casing around the distribution element. By means of such a construction, it is ensured that the solid particles supplied are distributed uniformly around the stream of droplets coming out of the distribution element 3. However, it is also possible to design the shape of the supply system for solid substance particles 6 in such a way that the distance of this system from the distribution element 3 is adjustable; but it is still important to bring the solid particles in a uniform stream into contact with the stream of droplets from the distribution element 3. To this end, the supply system for solid particles 6 is preferably designed as a powder distribution system which is placed more or less concentrically around the distribution element 3, and which is advantageously movable at least in the vertical direction and can distribute relatively large quantities of solid particles. Examples of such a supply system are a concentric gap around the distribution element 3 or a number of banana-shaped circular segment gaps which are adjustable in distance relative to the distribution element 3.

Reference number 14 shows a pipe present in the wall 13 of the drying chamber 2, for discharging drying gas and fine—powder—particles present therein. By means of a separating device 15, such as, for example, a cyclone, the fine particles can be separated from the gas and returned directly by way of pipe 6 to the supply system of solid particles 6 to the stream of primary liquid droplets from the distribution element 3. By this method, very economical use is made of the starting materials which are present. However, it is also possible to supply solid particles from another source to the primary liquid droplets from the distribution element 3.

Situated directly below the distribution element 3 is a first fluidized bed 7, which comprises a bottom plate with openings 8 which is surrounded by a wall 9. In the embodiment shown in FIG. 1, the bottom plate 8 is circular, and the bottom part of the wall is essentially cylindrical, while the top side is conical. Of course, other embodiments of the bottom plate 8, and of the wall 9, are also possible. The first fluidized bed 7 is preferably of the ideally mixed type, and generally has a bed temperature of 60°–80° C. In FIG. 1 a so-called airbox is placed centrally at the underside of the bottom plate with openings 8, as a result of which the air load can be increased locally and optimum mixing conditions can be achieved. The gasfeed to the airbox is preferably controlled with separately operated control and regulating means. However, it is also possible to increase the local air load in another way. To this end, the bottom plate 8 of the first fluidized bed 7 is preferably designed in such a way that the gas passage into the central part is larger than that into the surrounding part. This is achieved by making the openings in the bottom plate 8 larger in the central part than in the surrounding part, or by providing the central part with a larger number of openings than the surrounding part.

The wall 9 of the first fluidized bed 7 is provided with an opening 10, through which particles fully or partially dried in the first fluidized bed can be conveyed from said bed to the after treatment bed. The conveyance of particles from the first fluidized bed 7 can advantageously take place by providing such openings in the bottom plate 8 that the particles are conveyed in the direction of opening 10 by the gas supplied from the underside of the bottom plate 8.

The second fluidized after treatment bed 11 of partial annular form comprises a second bottom plate with openings 12, which is surrounded by both the wall 9 of the first fluidized bed and the outside wall 13 of the drying chamber. The embodiment of the bottom plate of the second fluidized bed shown in FIG. 1 is provided with openings slanting in the desired direction of conveyance, through which a gas stream is blown, so that particles conveyed from the first bed to the second bed are guided through the second bed out of the device. Although not shown in FIG. 1, only half of the second fluidized bed has a temperature of approximately 50°–70° C., so that a further drying of the particles occurs, while the other half of the second fluidized bed has a temperature of approximately 25°–35° C., in order to cool and condition particles. In order to prevent condensation from occurring on the wall 9, in particular the conical part, under the influence of the cold air from the second fluidized bed, said wall 9 can be, for example, a double-walled type.

Reference number 16 indicates the discharge pipe for discharging spray-dried particles from the device according to the present invention.

Figure 2:
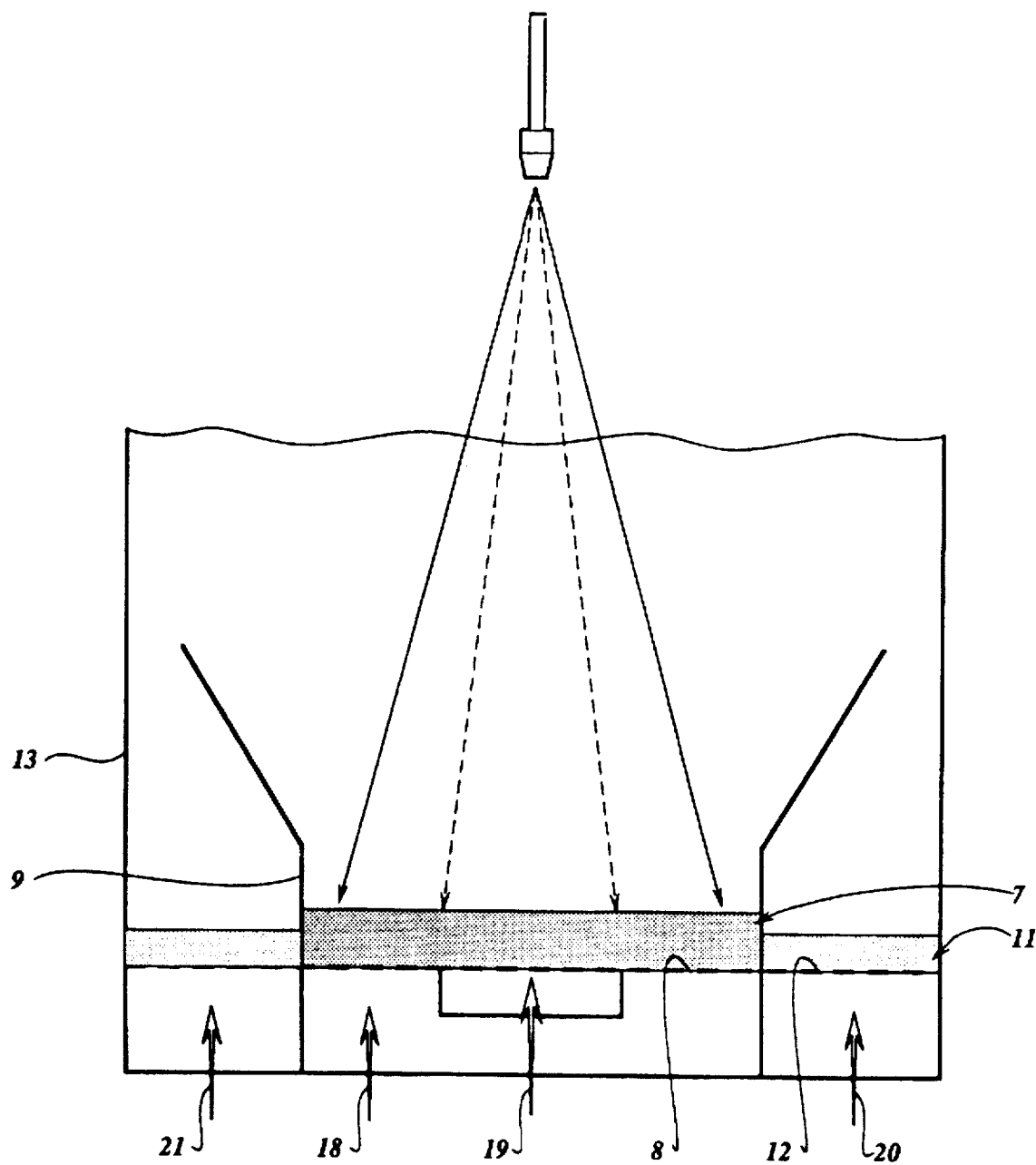

FIG. 2 shows a section of the first and the second fluidized bed, with the gas supply to the different beds. The fluidizing gas stream main flow fed through the first fluidized bed is indicated by reference number 18. The fluidizing gas stream partial flow, differing from the main flow, is produced by means of an airbox and is indicated by 19. The gas streams through the second fluidized after treatment bed, 20 and 21, can be the same or can differ in, for example, temperature.

The method for preparing a spray-dried product using the device according to the present invention is as follows.

A liquid to be spray-dried is guided by way of pipe 4 to the distribution element 3, where the liquid is atomized, forming primary liquid droplets, by the distribution element 3. At the same time, warm gas and solid substance are supplied by way of supply pipe 5 and supply system 6 respectively to the stream of droplets from the distribution element 3. Agglomeration of particles occurs through bringing the atomized droplets into contact with the solid substance. Partial drying of the atomized droplets and/or the solid substance can occur before and after agglomeration.

By in particular making use of a supply system 6 which is adjustable in distance relative to the distribution element 3, it can be determined at what stage after the atomization the droplets come into contact with the solid particles. By means of this adjustment, an agglomerate of the abovementioned capillary type or the funicular or pendular type can be obtained.

The weight ratio between solid substance and liquid advantageously lies in the range ½–2, preferably between 1 and 2, so that the relative moisture content of the combined streams of droplets and solid substance is low. The average moisture content consequently falls in the first section in the drying chamber 2, with the result that the stickiness decreases; the ratio can be adjusted such that the particles arriving in the fluidized bed have reached substantially their critical moisture content and therewith thermoplasticity.

The following values are given by way of illustration of the ratio between the quantities by weight of solid substance and liquid used in the method according to the present invention compared with the prior art.

| Product | s:l* (A) | | s:l* (B) | |
|---|---|---|---|---|
| skimmed milk | 800:450 | (1.78) | 225:500 | (0.45) |
| whey | 1000:700 | (1.43) | 225:500 | (0.45) |
| | 800:700 | (1.14) | | |
| whole milk | 750:450 | (1.67) | 150:450 | (0.33) |
| | 550:450 | (1.22) | | |
| yeast | 600:350 | (1.71) | | |
| | 400:350 | (1.14) | | | s: solid substance
l: liquid
(A): method according to the present invention
(B): method according to the prior art In the first drying section, on the one hand, at a position which may be adjustable or otherwise, droplets are bound to the surface of the solid particles supplied, while, on the other hand, the average moisture content of the product decreases greatly due to both the addition of relatively large quantities of solid particles to the stream of droplets from the distribution element 3 and the high temperature inside the drying chamber 2.

As shown in FIG. 1, the combined streams of droplets from the distribution element 3 and solid particles fall into the first fluidized bed 7, where these—partially dried—streams are received and mixed intensively with already further dried solid substance and warm gas present there. During this drying, the thermoplastic limit of the product is usually passed.

The distance from the distribution element 3 to the first fluidized bed 7, more particularly the bottom plate 8 of the first fluidized bed 7, combined with the spraying angle, is preferably selected in such a way that the stream fully penetrates into the centre of the bottom plate 8 of the first fluidized bed 7. The ratio between the extent of drying of solid particles in the first section in the drying chamber 2 and that in the first fluidized bed 7 is one of the factors which determines the size of the device; the more drying occurs in the fluidized bed, the smaller the device can be.

The stream entering the bed, essentially consisting of agglomerates of solid particles and droplets from the distribution element and gas, causes the drying gas supplied from the underside of the fluidized bed to deflect sideways. As a result of this, the incoming stream of agglomerates in the centre of the bed is isolated, which prevents the still moist and sticky particles from coming into contact with the wall 9 of the first fluidized bed 7. The formation of deposits on this wall 9 is avoided in this way.

Already dried particle-type material is conveyed by way of the opening 10 in wall 9 of the first fluidized bed 7 from the first fluidized bed 7 to the second fluidized after treatment bed 11. In the first part of the second fluidized after treatment bed 11 the solid particles are conveyed by means of warm drying gas in plug flow in the direction of the outlet. This produces further after-drying of the product. In the second part of the second fluidized after treatment bed 11 the particles are conveyed by means of a cold gas in the direction of the outlet, so that the particles are cooled and conditioned, in order to permit sieving, conveyance, storage and packaging of the product without the product properties being adversely affected. In addition to its function as a drying and/or cooling unit for solid particles, the second fluidized bed 11 can serve to prevent sticking of powder particles to the wall of the drying chamber 13. Passing a film of relatively cold air without moist powder along the straight wall of the drying chamber 13 prevents the particles from being deposited on the wall 13 of the drying chamber. This is partly why the soiling of the device is minimal. The air along the wall 13 of the drying chamber 2, together with the drying gas in the drying chamber 2, which is supplied both by way of supply pipe 5 and by way of the fluidized beds 7, 11, can leave the drying chamber by way of discharge pipe 14. After separation in a cyclone 15, the solid particles can be returned to the system. Since the waste gas is at a relatively low temperature, the particles entrained by the waste gas are less sticky, so that, by comparison with known devices, less soiling of the separating device (cyclone) occurs. Due to the fact that essentially all waste gases from the device pass into the top of the drying chamber, one discharge pipe 14 and separating device 15 will suffice.

It has been found that the required cubic volume of the device according to the present invention is only 20 to 40% compared with the conventional devices, and that the energy consumption is 10 to 30% lower. Besides, when the device according to the present invention is used, the formation of deposits on the wall 13 of the drying chamber 2 or on the wall 9 of the first fluidized bed 7 is largely prevented. In this case, by means of the device and the method according to the present invention, a very broad range of products can be processed to a high standard.

When observing the droplet stream which is delivered by the distribution element, it can be seen that the stream of droplets initially remains intact but, at a specific moment, begins to break up. If this break-up point is situated too far above the layer of the fluidized bed, there is a risk of liquid droplets, which are still wet and very sticky, hitting the walls and forming deposits thereon. It has been found in a number of tests that feeding back fine particles, as described above, has a stabilizing effect on the stream of liquid droplets, as a result of which the break-up point can be moved and the penetration depth of the stream into the drying chamber can be greater. By changing the ratio of solids to liquid droplets, it can be ensured that the stream of liquid droplets enters the fluidized bed in a virtually intact state.

By feeding in fine particles or other solid particles, the average moisture content of the moving primary liquid droplets can be reduced further, as a result of which it is possible to make the drying chamber still smaller and the distance of the distribution element from the fluidized bed can, if appropriate, be reduced to 0.75 times the distance which corresponds to a liquid droplet which has been dried to its critical moisture content.

The above-described airbox has an extremely beneficial effect on the fluidization process in the fluidized bed, and by disposing this airbox centrally it is ensured that the fluidization is maintained under all conditions.

In the table below, the above-described concentric embodiment is compared with a wide body spray-dryer produced by the applicant. Comparative tests have been carried out under typical conditions, and it can be seen that the above-described concentric spray-dryer is improved in terms of volume of the device, steam consumption, power consumption and specific energy consumption in comparison with the same measured variables for a more conventional wide body dryer.

The comparative test was carried out using skimmed milk at a total water evaporation capacity of 5,000 kg/h.

|  |  | Invention (FIG. 1, 2) | Wide body spray-dryer |
|---|---|---|---|
| Fraction evaporated in chamber | ,% | 85 | 94 |
| Dryer volume inc. fluid beds | m³ | 300 | 950 |
| Total steam consumption | kg/h | 7,500 | 8,800 |
| Total power consumption | kW | 325 | 380 |
| Specific energy consumption | kW · h/kg powder | 1.05 | 1.27 |

The concentric spray-dryer has been used successfully for drying pre-crystallized whey, skimmed milk powder, dried whole milk, children's food, hydrolysed yeast, calcium lactate and other products. Products which are difficult to dry, such as hydrolysed yeasts and calcium lactate, can be dried extremely well in this device.

Figure 3:
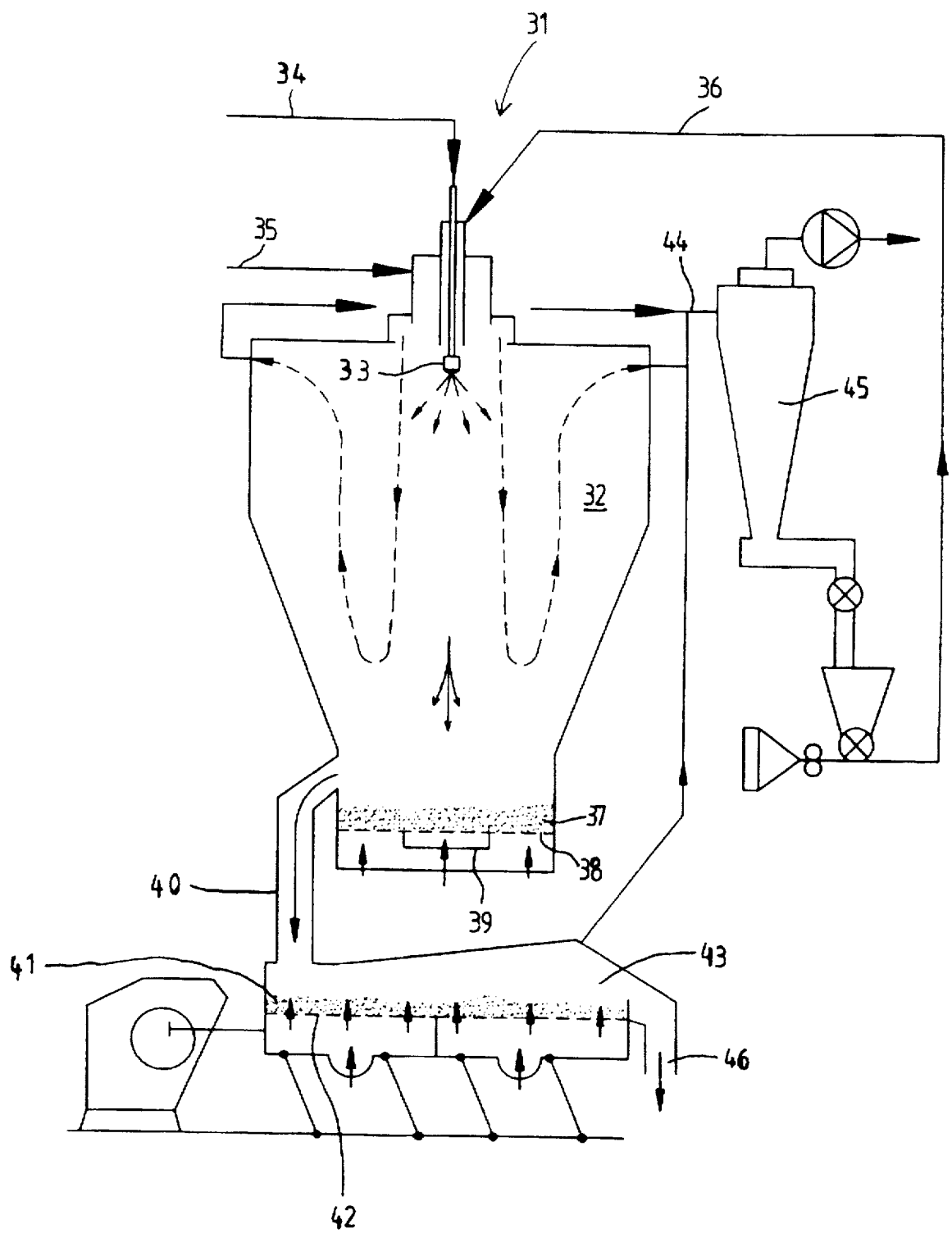

FIG. 3 describes an alternative embodiment of a spray-drying device 31 according to the invention. The device comprises a drying chamber 32, a distribution element 33 and a liquid supply 34 for the distribution element 33. The drying gas is introduced at 35 and a recirculation system 36 for fine particles separated out of the drying chamber is indicated; the fine particles are introduced inside a jacket which surrounds the supply line to the distribution element 33. A fluidized bed 37 having a bottom plate with openings 38 through which fluidizing gas is supplied adjoins the drying chamber 32. The figure shows a so-called airbox 39, which makes it possible to achieve different fluidizing conditions or fluidizing gas conditions or compositions at that location. The primary liquid droplets arriving in the fluidized bed, which have been dried to their critical moisture content, are dried further in the fluidized bed 37; essentially drying which forms part of the second drying stage takes place in the said bed. The particles from the fluidized bed 37 flow via line 40 to the fluidized aftertreatment bed 41 which is situated in chamber 43. The aftertreatment bed has a bottom plate 42, and it can be seen that the bottom plate adjoins a number of compartments, so that here too it is possible to use different fluidizing gas conditions or compositions at different parts of the fluidized aftertreatment bed. Following the aftertreatment phase, the product is discharged from the device via line 46.

In the above-described device according to the invention, it is important for the primary liquid droplets delivered by the distribution element to be dried to their critical moisture content in the drying chamber and for the distance which the primary liquid droplets cover in the drying chamber to correspond essentially to the distance which is required for drying of this kind. In the following example, it will be stated how the said distance is calculated for skimmed milk.

Skimmed milk was sprayed; the particle size distribution exhibited a $D_{50}$ of 250 micrometers. The critical moisture content of skimmed milk is ±20% by weight, based on the total of dry matter plus moisture.

Under conditions which are generally maintained when spray-drying skimmed milk (drying gas 250° C.; fluidization gas 25° C.), the time which is required for primary liquid droplets having a $D_{50}$ of 250 micrometers to reach a critical moisture content of 20% by weight is 0.04 sec. At an effective gas speed of 40 m/sec, which is normal in devices of this kind, a distance between the distribution element and the fluidized bed of 1.6 m is calculated. In a device of this kind, therefore, the drying chamber should be passed through only for the period of evaporation at a constant rate down to the critical moisture content of the primary liquid droplets.

We claim:

1. Device for preparing a spray-dried product, at least comprising a drying chamber with a distribution element placed therein for atomizing liquid to be spray-dried into a stream of primary liquid droplets, means for supplying drying gas in the vicinity of the distribution element and at least one fluidized bed which adjoins the drying chamber at a distance from the distribution element and comprising a bottom plate having openings with fluidizing gas supply means opening into the underside thereof, as well as discharge means for discharging spray-dried product and gas from the device, wherein the distance of the distribution element above the fluidized bed is equal to the distance which is required to enable a primary liquid droplet to reach, under drying chamber conditions, a moisture content which is in the range of from 1.5–0.75 times the critical moisture content.

2. Device according to claim 1, wherein the distance is equal to the distance which is required to enable a primary droplet to reach, under drying chamber conditions, a moisture content which is in the range of from 1.5–1.0 times the critical moisture content.

3. Device according to claim 1, wherein the distance is essentially equal to the distance which is required to enable a primary droplet to reach, under drying chamber conditions, a moisture content which is essentially equal to the critical moisture content.

4. Device according to claim 1, wherein the primary liquid droplets essentially fall directly into the fluidized bed.

5. Device according to claim 1, wherein the fluidized bed adjoining the drying chamber is in product flow connection with a fluidized aftertreatment bed.

6. Device according to claim 5, wherein the fluidized aftertreatment bed is enclosed by the drying chamber.

7. Device according to claim 6, wherein the fluidized bed and the fluidized aftertreatment bed respectively possess a first and a second bottom plate with openings and the device is designed such that the stream of primary liquid droplets falls essentially into the fluidized bed and material can be transported from the fluidized bed to the fluidized aftertreatment bed.

8. Device according to claim 6, wherein the fluidized aftertreatment bed essentially surrounds the fluidized bed.

9. Device according to claim 8, wherein at least two gas supply means, which can be controlled separately, are located on the underside of the bottom plate of the fluidized aftertreatment bed, the gases which are to be supplied by the separate gas supply means being able to be of different temperatures.

10. Device according to claim 6, wherein the first bottom plate with openings of the fluidized bed is encircled by a dividing wall extending essentially parallel to the axis of the distribution element.

11. Device according to claim 10, wherein the fluidized bed comprises an essentially cylindrical bed having an essentially circular first bottom plate with openings, which is encircled by an essentially cylindrical dividing wall, the centrepoint of the first bottom plate being in line with the axis of the distribution element, and the second fluidized aftertreatment bed comprising an essentially annular bed located concentrically around the fluidized bed, comprising an essentially annular bottom plate with openings which is encircled by the cylindrical dividing wall around the fluidized bed and the outer wall of the drying chamber, which is likewise cylindrical.

12. Device according to claim 6, wherein the drying chamber is a cylinder of constant diameter across its entire height.

13. Device according to claim 5, wherein the fluidized aftertreatment bed is disposed outside the drying chamber and is connected to the fluidized bed via a material transport line.

14. Device according to claim 1, wherein the surface of the underside of the bottom plate of the fluidized bed is partially covered by gas supply means which can be controlled separately and at that point permit a fluidizing gas flow rate through the corresponding part of the bottom plate which differs from the fluidizing gas main flow rate through the remaining part of the bottom plate which is not covered by the gas supply means in question.

15. Device according to claim 1, wherein means are present for supplying a stream of solid particles to the stream of primary liquid droplets which are delivered by the distribution element.

16. Device according to claim 15, wherein the means for supplying solid particles to the primary liquid droplets delivered by the distribution element comprise a system for separating fine particles from the gases within the drying chamber.

17. Device according to claim 15, wherein the means for supplying solid particles to the stream of primary liquid droplets which is delivered by the distribution element are adjustably disposed in relation to the distribution element.

18. Method for preparing a spray-dried product, said method comprising supplying a liquid which is to be spray-dried to an atomizing distribution element which is situated inside a drying chamber which atomizes the liquid into a stream of primary liquid droplets, delivering by the distribution element the primary liquid droplets at an average speed such that, the primary liquid droplets travel through the drying chamber over a distance which is required to enable a primary liquid droplet to reach a moisture content of from 1.5–0.75 times the critical moisture content and for essentially the period of evaporation at a constant rate and fall into the fluidized bed which adjoins the drying chamber, and collecting the primarily liquid droplets in the fluidized bed.

19. Method according to claim 18, wherein solid particles are supplied to the stream of primary liquid droplets which is delivered by the distribution element and wherein the ratio of the quantities by weight of solid particles to liquid is greater than or equal to 1:2.

20. Method according to claim 19, wherein at least some of the solid particles are fine particles which have been separated from the gas flow within the drying chamber.

21. Method according to claim 19, wherein the location at which the stream of solid particles is brought into contact with the stream of primary liquid droplets from the distribution element is adjusted as a function of the desired quality of the final product.

22. Device according to claim 11, wherein at least two gas supply means, which can be controlled separately, are located on the underside of the bottom plate of the fluidized aftertreatment bed, the gases which are to be supplied by the separate gas supply means being able to be of different temperatures.

* * * * *

UNITED STATES PATENT AND TRADEMARK OFFICE
CERTIFICATE OF CORRECTION

PATENT NO. : 5,782,010
DATED : July 21, 1998
INVENTOR(S) : Boersen, et al.

It is certified that error appears in the above-identified patent and that said Letters Patent is hereby corrected as shown below:

On the title page, item [56], insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 6 | 1 | 5 | 4 | 9 | 3 | 04/01/97 | Funder | | | |
| | | | | | | | | | | | | | |

Signed and Sealed this

Sixteenth Day of February, 1999

Attest:

Attesting Officer

Acting Commissioner of Patents and Trademarks